(12) United States Patent
Kienzle (10) Patent No.: US 9,430,123 B2
(45) Date of Patent: Aug. 30, 2016

(54) TRIGGERING A REFRESH OF DISPLAYED CONTENT ON A MOBILE DEVICE

(71) Applicant: Matthias Kienzle, Mannheim (DE)

(72) Inventor: Matthias Kienzle, Mannheim (DE)

(73) Assignee: SAP SE, Walldorf (DE)

( * ) Notice: Subject to any disclaimer, the term of this patent is extended or adjusted under 35 U.S.C. 154(b) by 108 days.

(21) Appl. No.: 13/648,013

(22) Filed: Oct. 9, 2012

(65) Prior Publication Data

US 2014/0101586 A1   Apr. 10, 2014

(51) Int. Cl.
  *G06F 3/0481* (2013.01)
  *G06F 3/0483* (2013.01)

(52) U.S. Cl.
  CPC .................. *G06F 3/0483* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,140,678 | A * | 8/1992 | Torres | G06F 3/0481 715/776 |
| 5,212,770 | A * | 5/1993 | Smith et al. | 715/746 |
| 5,224,207 | A * | 6/1993 | Filion | G03G 15/50 358/1.1 |
| 5,305,435 | A * | 4/1994 | Bronson | G06F 3/0481 715/775 |
| 5,367,624 | A * | 11/1994 | Cooper | G06Q 10/06 715/734 |
| 5,500,929 | A * | 3/1996 | Dickinson | G06F 3/0483 707/E17.111 |
| 5,764,873 | A * | 6/1998 | Magid et al. | 715/769 |
| 6,204,846 | B1 * | 3/2001 | Little et al. | 715/784 |
| 7,487,455 | B2 * | 2/2009 | Szeto | 715/752 |
| 8,542,206 | B2 * | 9/2013 | Westerman et al. | 345/173 |
| 2005/0081165 | A1 * | 4/2005 | Sobeski et al. | 715/848 |
| 2006/0248570 | A1 * | 11/2006 | Witwer | 725/135 |
| 2008/0036743 | A1 * | 2/2008 | Westerman et al. | 345/173 |
| 2008/0141132 | A1 * | 6/2008 | Tsai | 715/716 |
| 2008/0229233 | A1 * | 9/2008 | Blattner | 715/781 |
| 2009/0327947 | A1 * | 12/2009 | Schreiner | G06F 3/0483 715/777 |
| 2010/0031185 | A1 * | 2/2010 | Wilson | G06F 17/30905 715/777 |
| 2010/0082637 | A1 * | 4/2010 | Mishne et al. | 707/748 |
| 2010/0199180 | A1 * | 8/2010 | Brichter | 715/702 |
| 2011/0138313 | A1 * | 6/2011 | Decker et al. | 715/777 |
| 2011/0205248 | A1 * | 8/2011 | Honda et al. | 345/661 |
| 2011/0296336 | A1 * | 12/2011 | Law | G06F 3/0483 715/777 |
| 2012/0059929 | A1 * | 3/2012 | Ramanathaiah | H04L 67/02 709/224 |
| 2013/0061169 | A1 * | 3/2013 | Pearcy et al. | 715/788 |
| 2013/0145290 | A1 * | 6/2013 | Weber | G06F 3/04883 715/760 |
| 2013/0145291 | A1 * | 6/2013 | Weber | G06F 3/0481 715/760 |
| 2014/0033080 | A1 * | 1/2014 | Tong | G06F 17/30864 715/760 |

* cited by examiner

*Primary Examiner* — Phenuel Salomon
(74) *Attorney, Agent, or Firm* — Fish & Richardson P.C.

(57) ABSTRACT

The present disclosure involves methods, systems, and devices, including computer programs encoded on a computer storage medium, for providing a generic refresh of displayed content on computing devices, e.g., handheld devices. In one aspect, a method comprises displaying on a screen of the device a content area and a tab area comprising at least one tab. The content area is being refreshed upon receiving an activation of the tab followed by a command associated to a dragging of the tab towards a center of the screen followed by a command associated to a release of the tab, wherein the command associated to a dragging of the tab towards the center of the screen is received while receiving the activation of the tab. In some instances, the refreshing of the content area causes the content area to display updated web content associated to the tab.

11 Claims, 7 Drawing Sheets

TRIGGERING A REFRESH OF DISPLAYED CONTENT ON A MOBILE DEVICE

TECHNICAL FIELD

The present disclosure relates to devices, systems, and methods for providing a generic refresh of displayed content on computing devices.

BACKGROUND

Computing devices have taken on an expanding role in the daily life of many people. The variety of computing devices nowadays comprises desktop and laptop computers, cellular phones, smartphones, personal digital assistants, tablet computers, e-book readers and mobile players of media such as mp3 players or CD players. These devices possess different sizes of displays depending on their application. The variety of computing devices and their utilization in the daily life are thereby quickly expanding.

Mobile computing devices are increasingly employed by users for private and business applications. These devices are usually handheld devices and increasingly include touch-sensitive displays of various sizes to allow user inputs in a more convenient and more efficient manner. In view of an incorporation of handheld devices in more and more aspects of the daily life, the users demand ease of use in interacting with these devices, while there is an increasing demand for these devices to be wirelessly connected to the Internet or to an intranet.

For instance, certain users or certain aspects of the daily life may require a screen of the computing device to be a touch screen providing a touch-sensitive interface between a user and the computing device. Other circumstances may ask for non-touch-sensitive interfaces. Nevertheless, displayed content is demanded to be easily refreshable. However, certain interactions may not be practical or intuitive for certain users.

There are different approaches employed by current computing devices. For example, a refresh button may be used, which can trigger a refresh of displayed content after a user clicked or touched the button. Furthermore, scroll views may be used, which may force the user to scroll down a list of displayed information. For example, US 2010/0199180 (A1) describes user interface mechanics for pulling down to refresh, which in response to determining, based on a scroll command, that a scrollable refresh trigger has been activated, refreshes a scrollable list of content items.

SUMMARY

The present disclosure describes one or more general aspects involving devices, systems and methods for providing a generic refresh of displayed content on a computing device such as, for example, a handheld device.

One or more of the following innovative aspects of this disclosure can be embodied as methods that include the corresponding actions. One or more of the following innovative aspects of this disclosure can be implemented in a device comprising a processor, a processor-readable medium coupled to the processor having instructions stored thereon which, when executed by the processor, cause the processor to perform operations according to the one or more of the following aspects. One or more of the following innovative aspects of this disclosure can be implemented on a computer-readable medium having instructions stored thereon that, when executed by a processor, cause the processor to perform operations according to the one or more of the following aspects.

A general aspect of this disclosure comprises: displaying on a screen a content area and a tab area comprising at least one tab; refreshing the content area upon receiving an activation of the tab followed by a command associated with a dragging of the tab towards a center of the screen followed by a command associated with a release of the tab, wherein the command associated with a dragging of the tab towards the center of the screen is received while receiving the activation of the tab. These and other general aspects can each optionally include one or more of the following aspects.

In another aspect combinable with any of the preceding aspects, the activation of the tab causes the content area to display web content associated with the tab.

In another aspect combinable with any of the preceding aspects, the general aspect is implemented on a handheld device.

In another aspect combinable with any of the preceding aspects, the screen is a touch screen.

In another aspect combinable with any of the preceding aspects, the activation, the command associated with a dragging of the tab and the command associated with a release of the tab are touch-based commands.

In another aspect combinable with any of the preceding aspects, the tab is not a part of the content area.

According to another general aspect of this disclosure, a method implemented on a handheld device comprises: displaying on a touch screen of the handheld device a web content area and a tab area comprising multiple touch-sensitive tabs, wherein the multiple tabs are not a part of the web content area and are located at a bottom of the touch screen; receiving a touch-based activation of one of the multiple tabs triggering the web content area to display web content associated with the tab and triggering an indicator to pop up on the touch screen indicating that the tab is to be dragged to refresh the web content area; receiving, while still receiving the touch-based activation of the tab, a touch-based command associated with a dragging of the tab towards a center of the touch screen, wherein during the receiving of the command the indicator indicates that the tab is to be released to refresh the web content area; and refreshing the web content area upon receiving a touch-based command associated with a release of the tab.

In another aspect combinable with any of the preceding aspects, the refreshing of the content area causes the content area to display updated web content associated with the tab.

In another aspect combinable with any of the preceding aspects, the command associated with a dragging of the tab is disabled if no updated web content associated with the tab is available.

In another aspect combinable with any of the preceding aspects, the activation of the tab includes holding the tab.

In another aspect combinable with any of the preceding aspects, the command associated with a dragging of the tab includes holding the tab while dragging the tab.

In another aspect combinable with any of the preceding aspects, upon the activation of the tab, an indicator pops up which indicates that the tab is to be dragged to refresh the content area.

In another aspect combinable with any of the preceding aspects, while receiving the command associated with a dragging of the tab towards the center of the screen, an indicator pops up which indicates that the tab is to be released to refresh the content area.

In another aspect combinable with any of the preceding aspects, the tab is located at a bottom, at a top, at a left side or at a right side of the screen.

In another aspect combinable with any of the preceding aspects, it is indicated in the content area at least one difference between content displayed in the content area before and after the refreshing of the content area. For example, while the content area is being refreshed due to the receiving of the command associated with a release of the tab, the receiving of the command triggers in parallel a process which is configured to determine differences between the updated web content and the web content displayed in the content area before the refreshing.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

This disclosure generally relates to devices, systems, and methods for a generic refresh of displayed content on a computing device. Specifically, tools and methods for providing up-to-date web content (such as, e.g., text, tables, images or videos) to tab-based applications on handheld devices on a user's demand.

The subject-matter described in this disclosure can be implemented in particular embodiments so as to realize one or more of the following advantages.

First, a refresh or reload of displayed content on a computing device may be provided on a user's demand. This can circumvent continuous refreshing or reloading of displayed content which could lead to excessive data storage requirements and battery usage for the device. Such excessive data storage and battery usage can be impractical and/or costly, especially for handheld devices. For example, certain embodiments may allow a user to rank a refreshment of content within various processor exercises.

Second, certain embodiments can allow a refresh of displayed content on a computing device to be simplified and/or to be more intuitive for a user of the device without breaking with Human Interface Guidelines. For example, a use of web behavior, such as dedicated refresh buttons, may be avoided. Furthermore, number and complexity of distinct actions that a user may need to perform at an interface to the computing device to initiate a refresh or reload of displayed content may be reduced.

Third, certain embodiments may provide a refresh of displayed content on a computing device that keeps the cognitive burden of a user to an acceptable level while reliably executing the refresh of the displayed content for keeping the user up to date and enable her or him to make well-informed decisions.

Fourth, the subject matter described in this specification is not restricted to scroll views, but can rather work for various kinds of views and may therefore be flexibly applied depending on particular user demands and/or specifics of a system software or a type of computing device.

Other advantages will be apparent to those skilled in the art.

Figure 1:
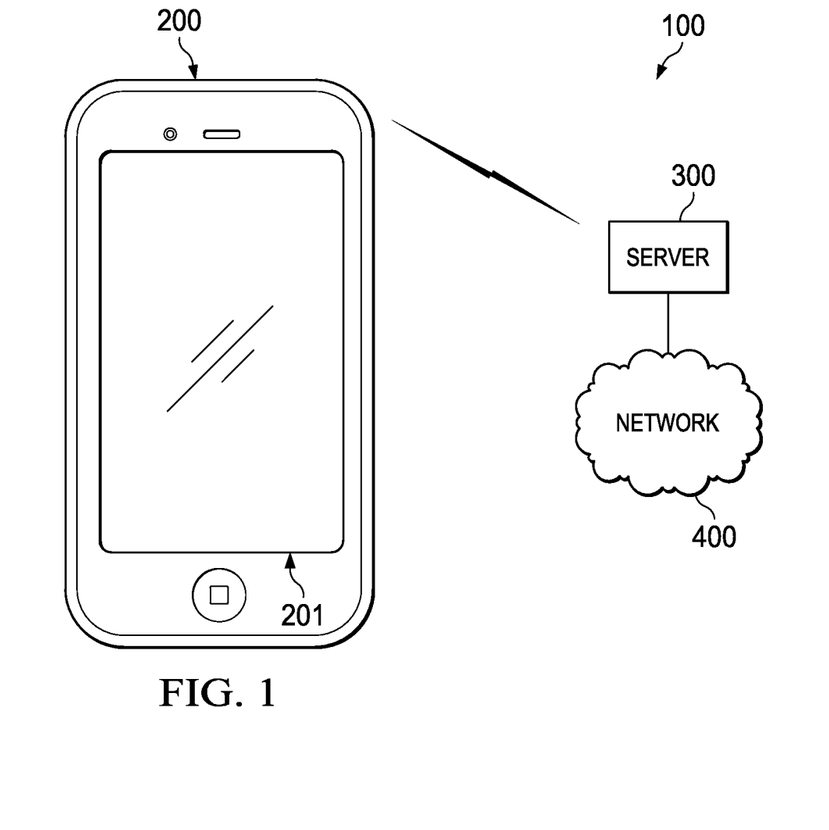
FIG. 1 illustrates an example operating environment for implementing various aspects providing a generic refresh of displayed content on a computing device.

FIG. 1 illustrates an example operating environment 100 for implementing various aspects providing a generic refresh of displayed content on a computing device 200. Operating environment 100 may include a server 300 and one or more networks 400, such as the Internet, public telephone network, a cellular network, a satellite network, a wireless local area network, a short-range connection network and/or the like. Computing device 200 may be a handheld device, a desktop or a laptop computer, a cellular phone, a smartphone, a personal digital assistant, a tablet computer, an e-book reader or a mobile player of media such as a mp3 player or a CD player. Computing device 200 may operate within operating environment 100 using one or more of the hardware and/or software described herein.

In one or more aspects, computing device 200 may communicate with server 300 via a wireless and/or wired network connection. For example, server 300 may connect to and/or communicate with computing device 200 via a wireless cellular network, which may enable computing device 200 to make and/or receive telephone calls. Server 300 may also connect to and/or communicate with computing device 200 via a wireless network to enable the computing device 200 to access a wide area network, such as the Internet. For example, computing device 200 may receive and send data via the Internet 400 and display web content via its screen 201. Computing device 200 may provide functionalities similar to and/or be used as a cell phone, a smart phone, a tablet PC, a laptop, a netbook, a personal digital assistant, an e-book reader and/or other computing devices, e.g., other mobile or handheld computing devices.

Figure 2:
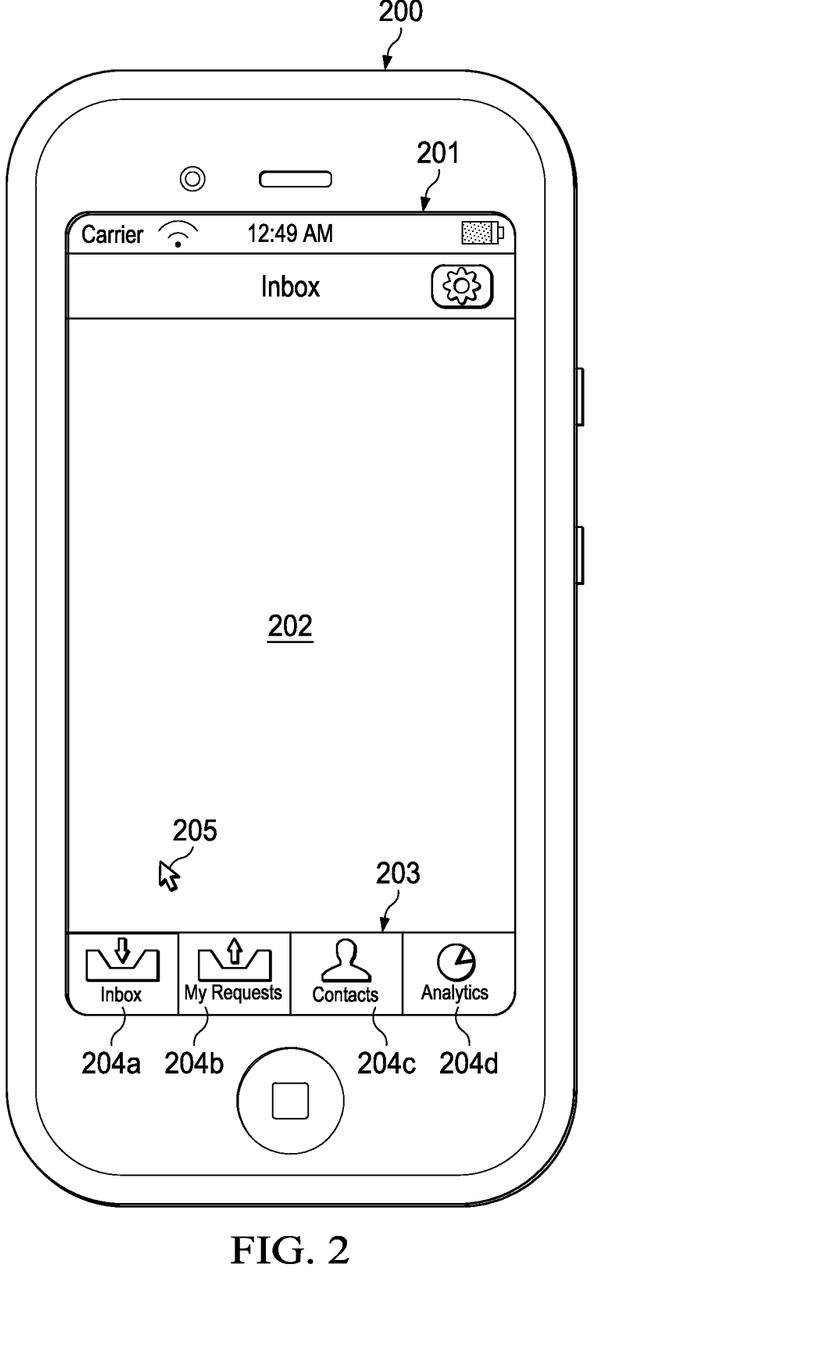
FIGS. 2-5 illustrate example screenshots of user interfaces by which a content area may be refreshed according to one or more aspects described herein.

FIG. 2 illustrates an example screenshot of a user interface by which a content area 202 may be refreshed according to one or more aspects described herein. Computing device 200 may comprise a screen 201 which displays the content area 202 and a tab area 203 which comprises at least one tab 204a-d. In this example, the tab area 203 comprises four tabs labeled as "Inbox", "My requests", "Contacts" and "Analytics". In general, different tabs 204a-d can cover different topics and/or provide different content. For example, a user may switch between different tabs to display web content associated with the different tabs. Some of the tabs 204a-d may be refreshable, others may not be refreshable, depending on the topic, context and/or content the tabs 204a-d are associated with. In a general aspect, tabs 204a-d can be located at the bottom, the top, the left side or the right side of the screen 201. In some instances, one or more of the tabs 204a-d remain at a lowest part (e.g., the bottom) of the screen independent on how the computing device 200 is oriented and/or held by a user. In an aspect, the tabs 204a-d are not a part of the content area 202. For example, the tab area 203 and/or the tabs 204a-d may be disjoint from the content area 202. One or more aspects described herein are not restricted to scroll views, but rather can work for various kinds of views and may therefore be flexibly applied depending on particular user demands and/or specifics of a system software or a type of computing device.

A user can use a pointer 205 to navigate on the screen 201 of computing device 200. In some aspects, the pointer 205 is a mouse pointer with which the user can click on a tab 204a-d. In other aspects, screen 201 is a touch screen and the one or more tabs 204a-d are touch-sensitive. In this case, a user can make touch input on the screen 201 via a finger or another object to activate, to drag or to release a tab 204a-d. For example, the user can use an object, such as a stylus, to touch the tab 204a-d.

Figure 3:
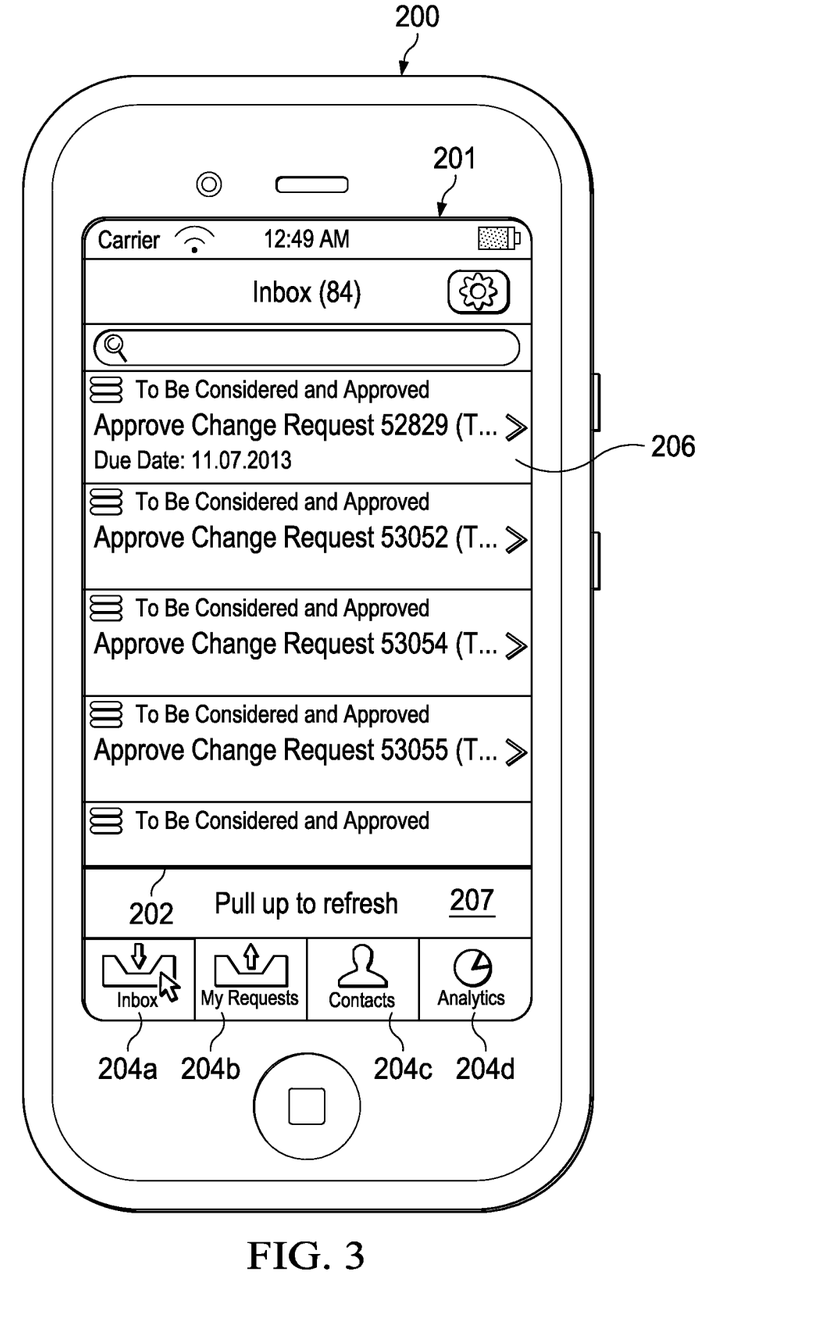

FIG. 3 illustrates an example screenshot of a user interface by which a content area 202 may be refreshed according to one or more aspects described herein. For example, a user can activate a tab 204a-d by using the pointer 205, wherein the activation of the tab 204a-d may trigger the content area 202 to display web content 206 which may be associated with the tab 204a-d. In general, an activation of a tab 204a-d may include holding the tab 204a-d. For example, an activation of a tab may include touching the tab with the pointer 205 (e.g., a finger) and holding the tab by continued touching of the tab 204a-d.

For instance, web content 206 (e.g., text, tables, images or videos) displayed in the content area 202 may be associated to the tab 204a-d. For example, web content 206 be current web content or web content which has been loaded to computing device 200 before the activation of the tab 204a-d. In an aspect, web content 206 may be based on content stored in a data store of computing device 200. In an implementation, web content 206 may be based on data received via one or more networks 400, such as via a wide area network (e.g., via the Internet). In general, web content 206 may comprise a list of content items (e.g., text, tables, images or videos) and may indicate a number of items the list comprises or which items have not been looked at in detail by a user.

Upon an activation of a tab 204a-d, an indicator 207 may pop up which indicates that the tab 204a-d is to be dragged to refresh the content area 202 displayed by the screen 201 of the computing device 200. For example, an activation of a tab 204a-d may trigger the indicator 207 to pop up. For instance, the indicator 207 can state a text like "Pull up to refresh" or a similar text. In some aspects, commands associated with a dragging of the tab 204a-d may be disabled if no updated web content associated with the tab 204a-d is available (e.g., if the displayed web content is already up to date) or if the content associated with the tab 204a-d is not refreshable or not desired to be updated. For example, a dragging of a tab 204a-d may not be available to a user if no updated web content associated with the tab 204a-d is available or if the content associated with the tab 204a-d is not refreshable. In these cases, the indicator 207 may not pop up or may indicate that no updated web content associated with the tab is available or the indicator may indicate that the content associated with the tab 204a-d is not to be updated.

Figure 4A:
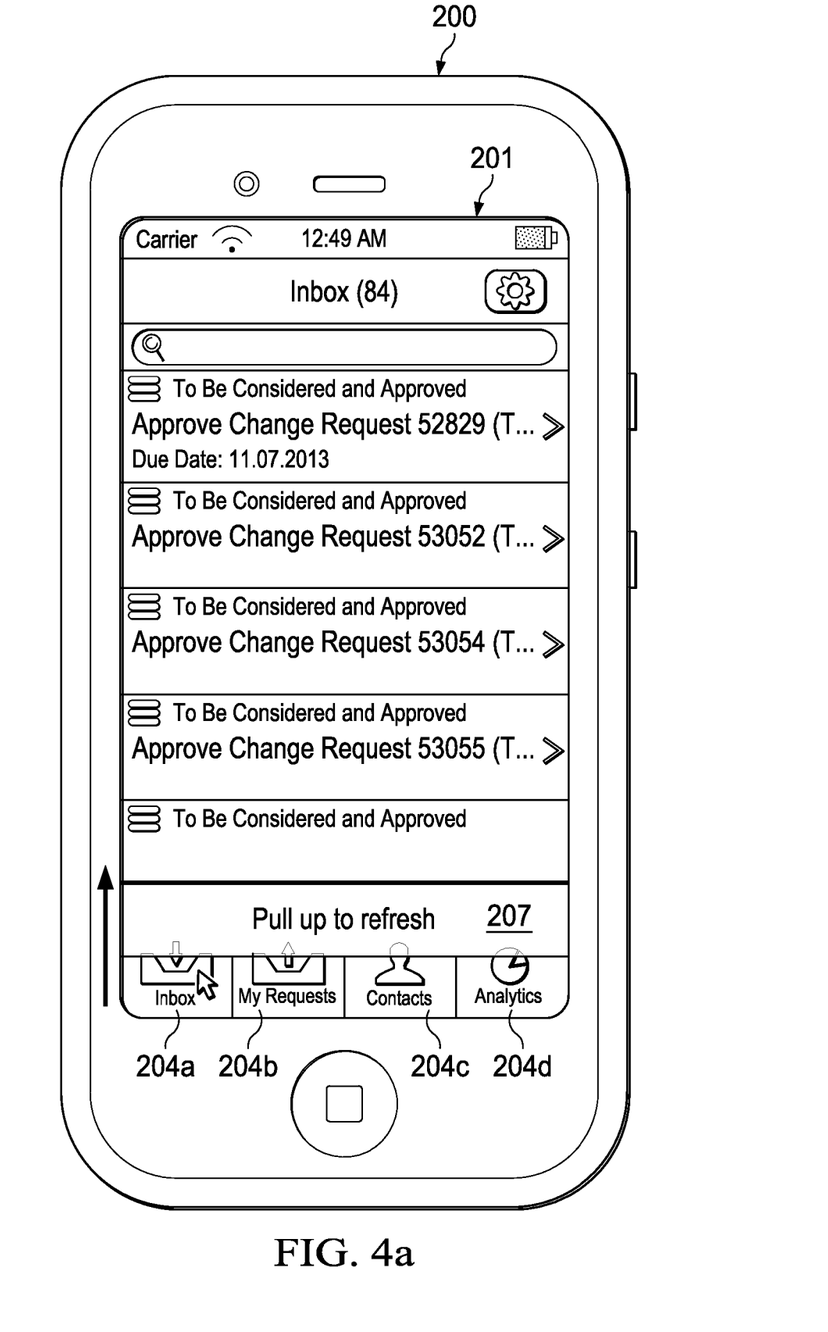
Figure 4B:
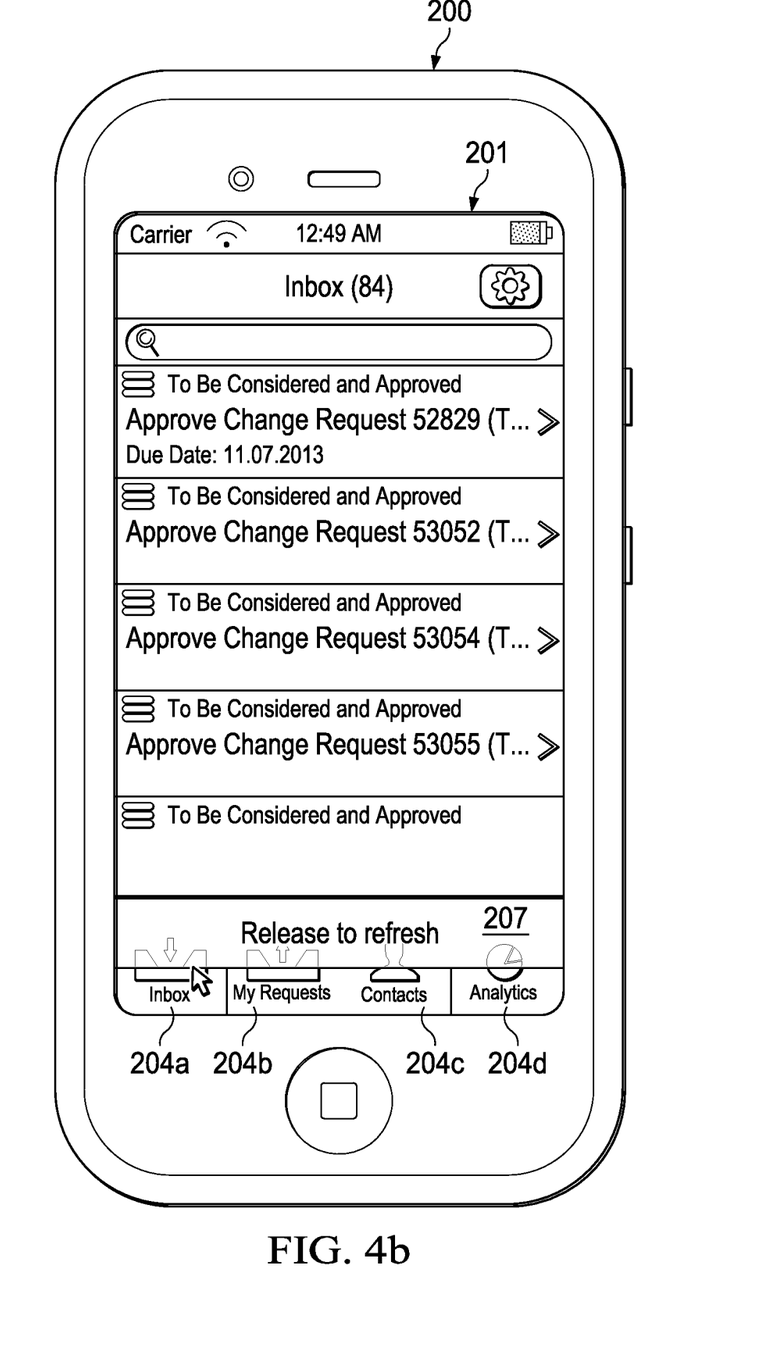

FIGS. 4a/b and 5 illustrate example screenshots of a user interface by which a content area 202 may be refreshed according to one or more aspects described herein. The content area 202 may be refreshed upon receiving an activation of the tab 204a-d (e.g., receiving a touching of a location associated with the tab 204a-d) followed by a command associated with a dragging of the tab 204a-d towards a center of the screen 201 (e.g., as indicated by an arrow in FIG. 4a) followed by a command associated with a release of the tab 204a-d (e.g., as indicated by an arrow in FIG. 5), wherein the command associated with a dragging of the tab 204a-d towards the center of the screen 201 is received while receiving the activation of the tab 204a-d (e.g., while receiving continued touching of the tab 204a-d).

One or more particular aspects may allow refreshing the content area 202 displayed by the screen 201 of the computing device 200 via a single movement, i.e. a single user-screen interaction in contrast to several distinct user-screen interactions. For example, in some aspects, a user of computing device 200 may refresh content area 202 by touching a tab 204a-d with a pointer (e.g., a an object as a finger or a stylus) and dragging the tab 204a-d, while still touching the tab 204a-d with the pointer, towards a center of screen 201 and subsequently releasing the tab 204a-d, e.g., by lifting the pointer from the screen 201. This may be in contrast to other user interfaces, where a user may have to select an icon displayed on an interface to determine content to be displayed and subsequently may have to click or touch another part of the interface, e.g., a part of the displayed content itself or a reload button, to reload the content.

The present disclosure describes one or more aspects, which may circumvent excessive web behavior and/or a need for several distinct user-screen interactions for updating, refreshing or reloading displayed content. In one or more aspects described herein, a refresh or reload of displayed content on a computing device can be simplified and/or may be more intuitive for a user of the device without breaking with Human Interface Guidelines. For example, a use of web behavior, such as dedicated refresh buttons, is avoided and/or the number and complexity of distinct actions that a user needs to perform at an interface to the device to initiate a refresh or reload of displayed content may be reduced.

FIG. 4b shows that in some aspects, while receiving the command associated with a dragging of the tab 204a-d (e.g., while receiving a touch-based dragging of the tab 204a-d) towards the center of the screen 201, the indicator 207 may indicate that the tab is to be released to refresh the content area 202. For example the indicator 207 can change its text to "Release to refresh" or a similar text.

In some aspects, the activation, the command associated with a dragging of the tab 204a-d and the command associated with a release of the tab 204a-d are touch-based commands. For instance, the activation of the tab 204a-d may include holding the tab 204a-d and the command associated with a dragging of the tab 204a-d includes holding the tab 204a-d while dragging the tab 204a-d. In an aspect, computing device 200 receives a touching of a tab 204a-d (e.g., by a user touching the screen 201) and receives, while still receiving the touching of the tab 204a-d, a dragging of the tab 204a-d (e.g., by a user touching the screen 201) towards a center of the screen 201 (e.g., as indicated by the arrow in FIG. 4a).

Figure 5:
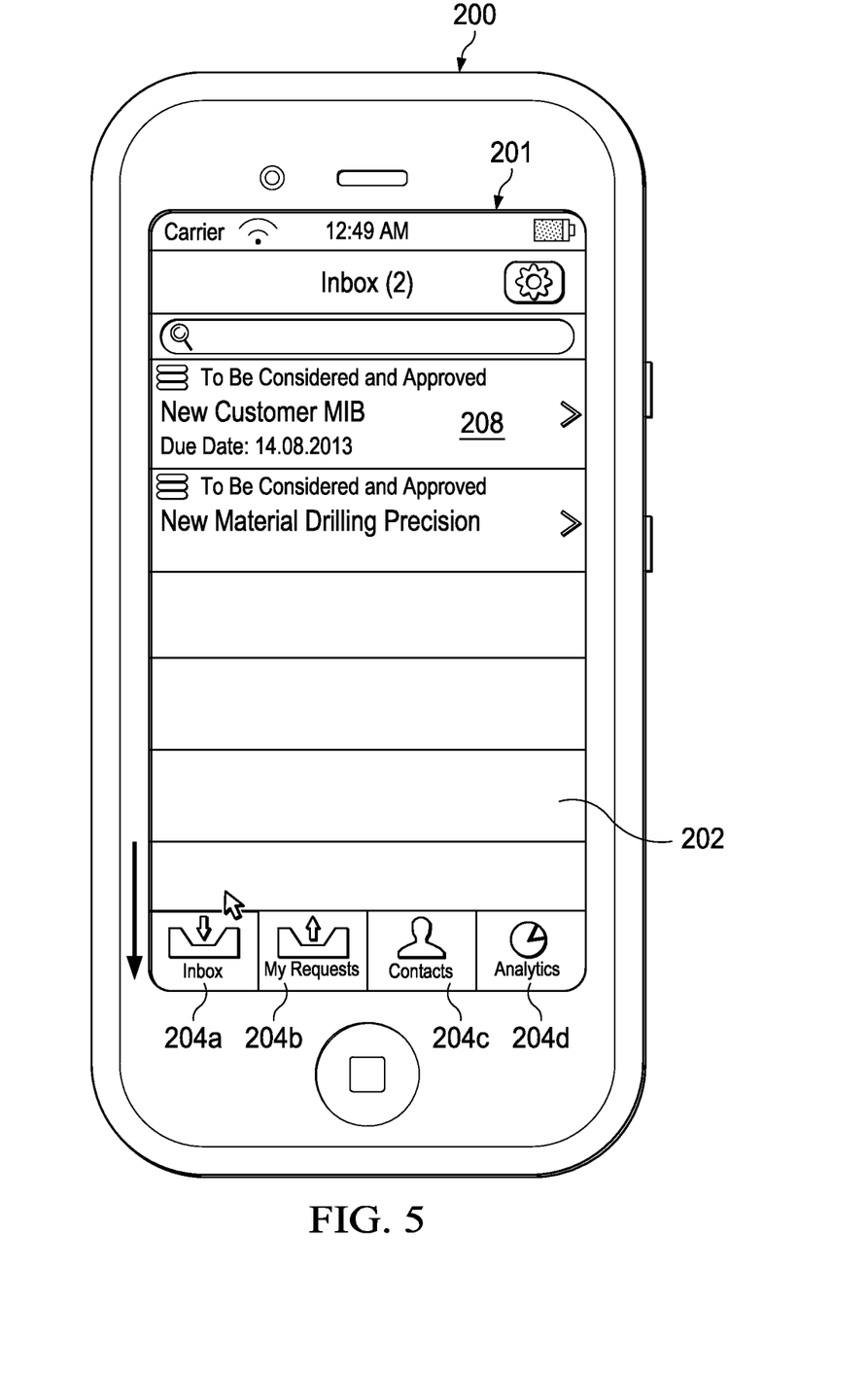

FIG. 5 shows that once the computing device receives a command associated with a release of the tab 204a-d (e.g., the user stops touching the screen 201 or at least stops touching the tab 204a-d by, e.g., lifting the pointer 205 from the screen 201), the content area 202 is refreshed. For example, the refreshed content area may display updated web content 208 (e.g., text, tables, images or videos) associated to the tab 204a-d or may display a uniform resource locator (URL) where updated web content 208 associated to the tab 204a-d may be found. In another aspect, it is indicated in the content area 202 at least one difference between content displayed in the content area 202 before 206 and after 208 the refreshing of the content area 202. For example, while the content area 202 is being refreshed due to the receiving of the command associated with a release of the tab 204a-d, the receiving of the command triggers in parallel a process which is configured to determine differences between the updated web content 208 and the web content 206 displayed in the content area 202 before the refreshing. For example, updated web content 208 may comprise a list of content items (e.g., text, tables, images or videos) and may indicate a number of items in the list.

For instance, updated web content 208 displayed in the content area 202 may be web content which is loaded via network 400 to computing device 200 once the command associated with a release of the tab 204*a-d* is received by the computing device 200. In an embodiment, updated web content 208 may be based on content stored in a data store of computing device 200. In an implementation, updated web content 208 may be based on data received via one or more networks 400, such as via a wide area network (e.g., via the Internet).

Figure 6:
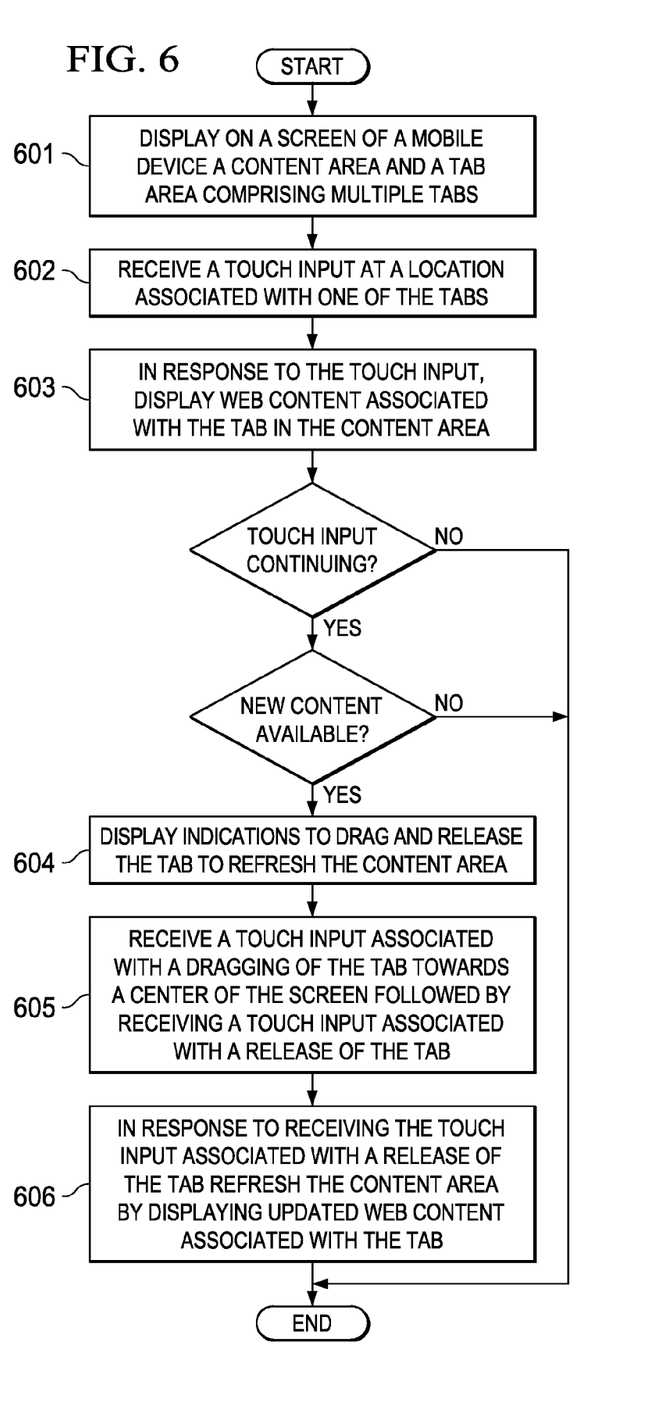
FIG. 6 describes an example process flow for providing a generic refresh of displayed web content on a mobile device.

FIG. 6 describes an example providing a generic refresh of displayed web content on a mobile device. The steps described in FIG. 6 may be implemented in and/or performed by and/or in conjunction with a computing device, such as computing device 200, which may be a handheld or mobile device.

After the example process in FIG. 6 is started, a content area and a tab area comprising multiple tabs are displayed on a screen of a mobile device in step 601. For example, the tab area may be disjoint from the content area or the tabs may be included in the tab area but not a part of the content area. For instance, the mobile device may be a handheld device and/or the screen may be a touch screen and/or the tabs may be touch-sensitive.

At step 602, a touch input at a location associated with one of the tabs is received. For instance, the touch input may be associated with an activation of the tab. In an aspect, the mobile device may identify that a user of the mobile device is touching the tab and may activate the tab.

At step 603, in response to the touch input, web content associated with the tab is displayed in the content area. For example, the touch input may trigger web content (e.g., text, tables, images or videos) to be displayed in the content area, wherein the web content may cover a particular topic, context or data type the tab is associated with. For instance, the web content may be a list of content items that have been retrieved via a network from a server to the mobile device before the touch input took place or may be content retrieved from a data store of the mobile device.

In a next step, it is determined if the touch input is still continuing, for example if the user is still touching the tab. If this is not the case, the process ends. If the touch input is continuing, it is determined if new content associated to the tab is available. For instance, it is determined if updated or newer web content associated to the tab is available. If there is no new content available, the process ends.

At step 604, an indicator displayed on the screen may indicate that no new content associated to the tab is available. However, if new content is available, an indicator pops up and indicates that the tab is to be dragged to refresh the content area. For example, the indicator may indicate that the tab is to be released to refresh the content area.

At step 605, a touch input associated with a dragging of the tab towards a center of the screen followed by a touch input associated with a release of the tab are received. For example, a dragging of the tab towards the center of the screen followed by a release of the tab may be received. In an aspect, a dragging of the tab may be disabled or may be unavailable if no new content is available. For example, a user may recognize by a unavailability of the dragging of the tab that no new web content associated with the tab is available.

In an aspect of step 605, the user of the mobile device may touch the screen with a finger and drag the tab towards the center of the screen and subsequently may release the tab by lifting the finger from the screen. In an aspect, the user may be enabled to initially touch the tab with one finger and drag the tab with another finger without any departure from the process flow or the results in FIG. 6. In some instances, the indicator of step 604 makes the indications of step 604 at certain instants of time during the dragging of the tab on the screen. For example, the indicator may first display a first message indicating to drag the tab to refresh the content and then after a certain period of time, the indicator may display a second message indicating to release the tab to refresh the content.

At step 606, in response to receiving the touch input associated with a release of the tab the content area is refreshed by displaying updated web content associated with the tab. For example, once the user lifts the finger from the screen to release the tab, the content area is refreshed and updated web content is displayed in the content area. In an aspect, differences between the web content displayed before and after the refreshing of the content area are displayed in the updated content or the content area. After the refreshing of the content area, the process in FIG. 6 ends. The example in FIG. 6 may be augmented by other aspects described in this disclosure or certain steps in FIG. 6 may be excluded both without departure from the subject-matter disclosed herein. For example, in some instances, once the refresh process of 606 has begun to run after triggering by a user, no additional trigger may be possible until the triggered refresh process is complete. In other words, the trigger functionality may be temporarily disabled. Once the data is fully refreshed and has been displayed in the content area, refreshing may again be possible.

At a high level, computing device 200 comprises an electronic computing unit (e.g., a processor) operable to receive, transmit, process, store, or manage data and information associated with the operating environment 100. Particular aspects described above allow a user to refresh a content area on the computing device 200 on a user's demand and without requiring a background process to continuously refreshing or reloading web content via a network connection to a back-end system (e.g., server 300). This provides a reduced need for data storage and battery lifetime of computing device 200 while it reduces at the same time processor load of computing device 200.

As used in the present disclosure, the term "computing device" is intended to encompass any suitable processing device. For instance, computing device 200 may be a desktop or a laptop computer, a cellular phone, a smartphone, a personal digital assistant, a tablet computer, an e-book reader or a mobile player of media such as a mp3 player or a CD player. Furthermore, although FIG. 1 illustrates a single server 300, operating environment 100 can be implemented using any number of servers, as well as computers other than servers, including a server pool. Indeed, the computing device 200 and the server 300 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the illustrated computing device 200 and server 300 may be adapted to execute any operating system, including Linux, UNIX, Windows, Mac OS, iOS, Android or any other suitable operating system.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Perl, any suitable version of 4GL, as well as others.

The figures and accompanying description illustrate example processes and computer-implementable techniques. However, operating environment 100 (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the steps in these processes may take place simultaneously, concurrently, and/or in different orders or combinations than shown. Moreover, environment 100 may use processes with additional steps, fewer steps, and/or different steps, so long as the methods remain appropriate.

Thus, particular aspects of the subject-matter have been described. Other aspects or embodiments are within the scope of the following claims. In some cases, the actions recited in the claims can be performed in a different order or combination and still achieve desirable results. In certain aspects, multitasking and parallel processing may be advantageous.

In other words, although this disclosure has been described in terms of certain implementations and aspects, generally associated methods, alterations and permutations of these implementations and methods will be apparent to those skilled in the art. Accordingly, the above description of example implementations does not define or constrain this disclosure. Other changes, substitutions and alterations are also possible without departing from the spirit and scope of this disclosure.

Aspects of the subject-matter and the operations described in this specification can be implemented in digital electronic circuitry, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer or computing device 200 may be a processor for performing actions in accordance with instructions and one or more memory devices for storing instructions and data. Generally, a computer or computing device 200 will also include, or be operatively coupled to receive data from or transfer data to, or both, one or more mass storage devices for storing data, e.g., magnetic, magneto-optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject-matter described in this specification can be implemented on a computer having a non-flexible or flexible screen 201, e.g., a CRT (cathode ray tube), LCD (liquid crystal display) or OLED (organic light emitting diode) monitor, for displaying information to the user and a keyboard and a pointer 205, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computing device 200 can interact with a user by sending documents to and receiving documents from a device that is used by the user; for example, by sending web pages to a web browser on a user's user device in response to requests received from the web browser.

Embodiments of the subject-matter described in this specification can be implemented in a computing system that includes a back-end component, e.g., as a server 300, or that includes a middleware component, e.g., an application server, or that includes a front-end component, e.g., a user computer having a graphical user interface or a Web browser through which a user can interact with an implementation of the subject-matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

In general, the separation of various system components in the aspects described above should not be understood as requiring such separation in all implementations, and it should be understood that the described program components and system components can generally be integrated together in a single software or hardware product or packaged into multiple software or hardware products.

What is claimed is:

1. A non-transitory computer-readable medium having computer-executable instructions stored thereon that, when executed by a processor, cause the processor to perform operations, comprising:
    displaying on a touch screen a content area and a tab area comprising a plurality of tabs, each tab comprising a selectable icon identified by a label, the label identifying the content associated with the corresponding tab;
    receiving a first touch-based activation of a particular tab of the plurality of tabs, the activation occurring as a result of the touch to the selectable icon associated with the particular activated tab; and
    in response to receiving the first touch-based activation of the particular activated tab:
        presenting the content area with preloaded web content associated with the particular activated tab;
        receiving, while continuously receiving the first touch-based activation of the particular activated tab via the touch to the selectable icon associated with the particular activated tab, a touch-based command associated with a dragging of the selectable icon associated with the particular activated tab toward a center of the screen followed by a touch-based command associated with a release of the selectable icon associated with the particular activated tab; and
        in response to the touch-based command associated with the release of the selectable icon associated with the particular activated tab, refreshing the presented content area to display updated web content associated with the particular activated tab, wherein only web content associated with the particular activated tab is refreshed in response to the touch-based command associated with the release of the particular activated tab;
        wherein the touch-based command associated with the dragging of the selectable icon associated with the particular activated tab is disabled if no updated web content associated with the particular activated tab is available, wherein, when disabled, an indicator associated with the particular activated tab does not pop up or otherwise indicates that no updated web content associated with the particular activated tab is available.

2. The non-transitory computer-readable medium of claim 1, wherein in response to the first touch-based activation of the particular activated tab when updated web content associated with the particular activated tab is available, an indication on the touch screen indicates that the particular activated tab is to be dragged to refresh the content area, and wherein while receiving the touch-based command associated with a dragging of the selectable icon associated with the particular activated tab towards the center of the screen, the indication indicates that the particular activated tab is to be released to refresh the content area.

3. The non-transitory computer-readable medium of claim 2, wherein upon releasing the particular activated tab to refresh the content area, additional dragging of the selectable icon associated with the particular activated tab is disabled until the content area is refreshed.

4. The non-transitory computer-readable medium of claim 1, wherein the plurality of tabs is not a part of the content area and is located at a periphery of the touch screen.

5. A handheld device, comprising:
    a processor; and
    a processor-readable medium coupled to the processor having instructions stored thereon which, when executed by the processor, cause the processor to perform operations comprising:

displaying on a touch screen of the handheld device a content area and a tab area comprising a plurality of tabs, each tab comprising a selectable icon identified by a label, the label identifying the content associated with the corresponding tab;

receiving a first touch-based activation of a particular tab of the plurality of tabs, the activation occurring as a result of the touch to the selectable icon associated with the particular activated tab; and in response to receiving the first touch-based activation of the particular activated tab:

presenting the content area with preloaded web content associated with the particular activated tab;

receiving, while continuously receiving the first touch-based activation of the particular activated tab via the touch to the selectable icon associated with the particular activated tab, a touch-based command associated with a dragging of the selectable icon associated with the particular activated tab toward a center of the screen followed by a touch-based command associated with a release of the selectable icon associated with the particular activated tab; and in response to the touch-based command associated with the release of the selectable icon associated with the particular activated tab, refreshing the presented content area to display updated web content associated with the particular activated tab, wherein only web content associated with the particular activated tab is refreshed in response to the touch-based command associated with the release of the particular activated tab;

wherein the touch-based command associated with the dragging of the selectable icon associated with the particular activated tab is disabled if no updated web content associated with the particular activated tab is available, wherein, when disabled, an indicator associated with the particular activated tab does not pop up or otherwise indicates that no updated web content associated with the particular activated tab is available.

6. The device of claim 5, wherein in response to the first touch-based activation of the particular activated tab when updated web content associated with the particular activated tab is available, an indication on the touch screen indicates that the selectable icon associated with the particular activated tab is to be dragged to refresh the content area, and wherein while receiving the touch-based command associated with a dragging of the selectable icon associated with the particular activated tab towards the center of the screen, the indication indicates that the selectable icon associated with the particular activated tab is to be released to refresh the content area.

7. The device of claim 5, wherein the plurality of tabs is not a part of the content area and is located at a periphery of the touch screen.

8. A method, comprising:

displaying on a touch screen a content area and a tab area comprising a plurality of tabs, each tab comprising a selectable icon;

receiving a first touch-based activation of a particular tab of the plurality of tabs, the activation occurring as a result of the touch to the selectable icon associated with the particular activated tab; and in response to receiving the first touch-based activation of the particular activated tab:

presenting the content area with preloaded web content associated with the particular activated tab;

receiving, while continuously receiving the first touch-based activation of the particular activated tab via the touch to the selectable icon associated with the particular activated tab, a touch-based command associated with a dragging of the selectable icon associated with the particular activated tab toward a center of the screen followed by a touch-based command associated with a release of the selectable icon associated with the particular activated tab; and in response to the touch-based command associated with the release of the selectable icon associated with the particular activated tab, refreshing the presented content area to display updated web content associated with the particular activated tab, wherein only web content associated with the particular activated tab is refreshed in response to the touch-based command associated with the release of the particular activated tab;

wherein the touch-based command associated with the dragging of the selectable icon associated with the particular activated tab is disabled if no updated web content associated with the particular activated tab is available, wherein, when disabled, an indicator associated with the particular activated tab does not pop up or otherwise indicates that no updated web content associated with the particular activated tab is available.

9. The method of claim 8, wherein in response to the first touch-based activation of the particular activated tab when updated web content associated with the particular activated tab is available, an indication on the touch screen indicates that the selectable icon associated with the particular activated tab is to be dragged to refresh the content area, and wherein while receiving the touch-based command associated with a dragging of the selectable icon associated with the particular activated tab towards the center of the screen, the indication indicates that the selectable icon associated with the particular activated tab is to be released to refresh the content area.

10. The method of claim 8, wherein the plurality of tabs is not a part of the content area and is located at a periphery of the touch screen.

11. A method implemented on a handheld device, comprising:

displaying on a touch screen of the handheld device a web content area and a tab area comprising multiple touch-sensitive tabs, wherein the multiple tabs are not a part of the web content area and are located at a periphery of the touch screen, and wherein each touch-sensitive tab comprises a selectable icon identified by a label, the label identifying the content associated with the corresponding tab;

receiving a first touch-based activation of a particular tab of the multiple tabs, the activation occurring as a result of the touch to the selectable icon associated with the particular activated tab, wherein receipt of the first touch-based activation triggers the web content area to display preloaded web content associated with the particular activated tab and triggers an indication on the touch screen indicating that the selectable icon associated with the particular activated tab is to be dragged to refresh the web content area;

receiving, while continuously receiving the first touch-based activation of the particular activated tab via the touch to the selectable icon associated with the particular activated tab, a touch-based command associated with a dragging of the selectable icon associated with the particular activated tab towards a center of the touch screen, wherein the selectable icon is located on the touch screen in an area different than the web content area, wherein during the receiving of the command associated with the dragging of the selectable icon associated with the particular activated tab the indicator indicates that the selectable icon associated with the particular activated tab is to be released to refresh the web content area; and refreshing the web content area to display updated web content associated with the particular activated tab in response to receiving a touch-based command associated with a release of the selectable icon associated with the particular activated tab, wherein only web content associated with the particular activated tab is refreshed in response to the touch-based command associated with the release of the selectable icon associated with the particular activated tab;

wherein the touch-based command associated with the dragging of the selectable icon associated with the particular activated tab is disabled if no updated web content associated with the particular activated tab is available, wherein, when disabled, the indicator associated with the particular activated tab does not pop up or otherwise indicates that no updated web content associated with the particular activated tab is available.

\* \* \* \* \*